United States Patent [19]

Michaelis

[11] Patent Number: 4,460,857
[45] Date of Patent: Jul. 17, 1984

[54] ENCODER CONTROLLED APPARATUS FOR DYNAMIC BRAKING

[75] Inventor: Theodore D. Michaelis, Medford, N.J.

[73] Assignee: RCA Corporation, New York, N.Y.

[21] Appl. No.: 499,794

[22] Filed: May 31, 1983

[51] Int. Cl.$^3$ .............................. H02P 3/20
[52] U.S. Cl. ................... 318/375; 318/480; 318/603
[58] Field of Search .......... 318/603, 480, 460, 364, 318/367, 640, 373, 375

[56] References Cited

U.S. PATENT DOCUMENTS

| | | | |
|---|---|---|---|
| 2,589,276 | 3/1952 | Noodleman | 318/374 X |
| 2,656,106 | 10/1953 | Stabler | 318/603 X |
| 3,211,981 | 10/1965 | Jordan | 318/212 |
| 3,668,494 | 6/1972 | Agin | 318/373 |
| 3,737,751 | 6/1973 | Lima | 318/463 |
| 3,969,663 | 7/1976 | Arthur et al. | 318/374 X |
| 3,995,208 | 11/1976 | Parr | 318/612 |
| 4,127,799 | 11/1978 | Nakamura et al. | 318/373 |
| 4,193,022 | 3/1980 | Bertolasi | 318/592 |
| 4,216,422 | 8/1980 | Divjak et al. | 318/612 |
| 4,286,790 | 9/1981 | Siryj et al. | 369/36 |
| 4,329,633 | 5/1982 | Dunfield | 318/612 |
| 4,418,305 | 11/1983 | Otsuki et al. | 318/616 |

FOREIGN PATENT DOCUMENTS

| | | | |
|---|---|---|---|
| 2470506 | 6/1981 | France | 318/640 |
| 34310 | 3/1977 | Japan | 318/373 |
| 31387 | 2/1982 | Japan | 318/603 |
| 101580 | 6/1982 | Japan | 318/373 |
| 148585 | 9/1982 | Japan | 318/373 |

OTHER PUBLICATIONS

IBM Technical Disclosure Bulletin, vol. 22, No. 6, Nov. 1979.

Primary Examiner—B. Dobeck
Assistant Examiner—Bentsu Ro
Attorney, Agent, or Firm—Joseph S. Tripoli; Robert L. Troike; Christopher Lyle Maginniss

[57] ABSTRACT

A rapidly-spinning motor-driven disc is quickly brought to a halt by utilizing the motor in a controlled current dynamic feedback mode. An electrical signal is provided to cut off the motor braking current when the rotating motor shaft reaches substantially zero velocity, thereby avoiding any residual rotation of the disc. As the disc slows at a constant deceleration rate, the apparatus measures the relative time durations of two consecutive pulses which represent equal displacement arcs on the disc. From these data the time at which zero velocity will be achieved is computed, and the motor current cutoff signal is generated at the proper instant.

15 Claims, 4 Drawing Figures

ENCODER CONTROLLED APPARATUS FOR DYNAMIC BRAKING

The Government has rights in this invention pursuant to a government contract.

The present invention relates to dynamic motor braking and, more particularly, to an apparatus and method which utilize displacement information encoded on a motor-driven rotating disc to interrupt the reverse dc current used to stop the motor.

In a high speed data storage and retrieval system for use with disc record media, which can be of the general type disclosed in U.S. Pat. No. 4,286,790, "Optical Disc Changer Apparatus," issued Sept. 1, 1981, to B. W. Siryj and A. P. Gilson, and assigned to the same assignee as the present invention, it is important that the disc handling procedures take place as quickly and efficiently as possible. One of these procedures is the stopping of the rapidly spinning disc so that it may be immobilized within a protective cartridge. The disc must be completely stopped before it is locked in place in the cartridge in order to prevent the formation of abraded particles which would obscure the data pits on the disc. Nevertheless, rapid braking is necessary to minimize the disc-to-disc access time of the system.

There are several approaches to the solution of the problem of stopping the disc rapidly. A brake can quickly and positively reduce the velocity of the disc to zero. However, a friction brake is undesirable because of the possibility of particle formation. One currently-used braking method employs a hysteresis brake; however, this candidate presents the disadvantages of high cost and slow response. Thus its use for disc change purposes is unwarranted. Furthermore, elimination of this brake from the system would permit the use of a larger, higher performance drive motor for the discs.

The apparatus of the present invention utilizes the drive motor in a controlled current dynamic feedback mode. In this mode the spin velocity of the motor is decreased linearly and a disc rotating at 30 Hz can be brought to a stop in about one second. The difficulty with this mode of braking is the need to monitor disc velocity in order to ascertain when to cut the motor torque. If the torque cutoff occurs too early, the disc will not have stopped completely and will continue to coast. If torque cutoff occurs too late, the disc will reach zero velocity and begin to rotate in the reverse direction.

Velocity information can be provided with a high degree of precision by the inclusion of an analog tachometer within the system. However, this would add unwanted cost and complexity. It is the object of this invention to provide a dynamic braking system which does not require spin velocity measuring apparatus.

In accordance with the principles of the present invention, an apparatus is disclosed for use in a system which includes a motor wherein braking is effectuated by the application of reverse current and which further includes means for generating a succession of pulses having time durations which are inversely proportional to the rotational speed of the motor. The apparatus includes means for measuring the time durations of the pulses and means responsive to a first and a second of the time duration measurements, wherein the second time duration is measured subsequent to the first, for computing the time at which the motor rotational speed will be zero. Finally, means are provided which are responsive to the computing means for generating a signal to cause interruption of the reverse current.

The apparatus of the present invention finds application in systems which employ an angular incremental encoder to provide information concerning displacement of the motor shaft. One example of such an encoder is an optical encoder disc which typically is a disc affixed to the motor shaft so as to rotate therewith. The disc includes strips of optically transmissive material alternating with strips of optically non-transmissive material, wherein the strips are disposed radially within a band (or track) which is substantially concentric with the axis of rotation. A source of light radiation is positioned on one side of the disc adjacent the track and a light detector is located in a corresponding position on the opposite side of the encoder disc. As the disc rotates, the detector sees bursts of light at a repetition rate in proportion to the disc rotational frequency. Hence the electrical output signal of the detector provides displacement information relating to motor shaft position and can be used in a servo system to control motor speed.

Typical encoder discs include a plurality of such tracks wherein the number of alternating transmissive and non-transmissive zones bear a binary-coded relationship between such tracks, thus providing absolute displacement information. Many such discs also include a track with a single mark to thereby provide a single reference pulse for each rotation of the motor. In the example to be used in describing the present invention, a single encoder disc track is used, which track provides 1,024 encoder pulses in each complete rotation.

In spite of the foregoing description of optical encoder discs, it should be borne in mind that the teachings of this invention will be applied equally well to any source of rotational displacement information, including regularly-spaced data information recorded on a disc record. Thus, it will be seen that the invention will be useful in many applications where it is desired to bring a motor shaft to a halt.

Figure 1:
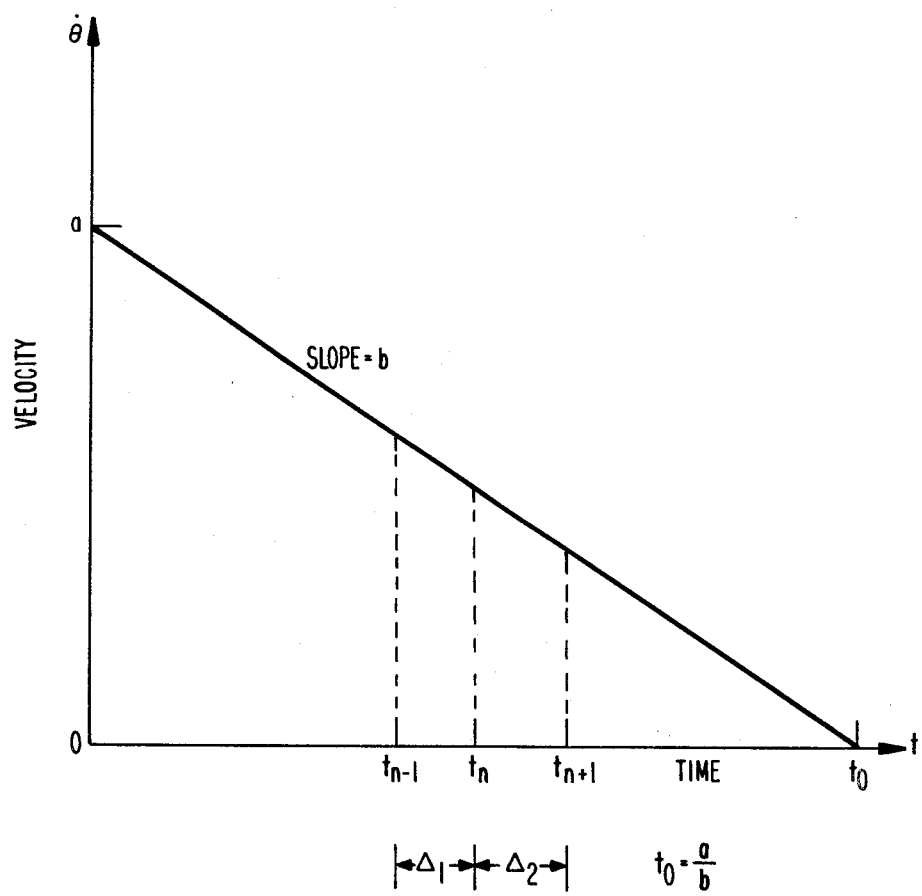
FIG. 1 illustrates dynamic braking on a time-velocity graph.

The system to be described herein measures the time which elapses as two successive encoder pulses are generated. Referring to FIG. 1, the first pulse is measured from time $t_{n-1}$ to time $t_n$; this period is defined as $$\Delta_1 = t_n - t_{n-1}. \tag{1}$$

Similarly, the next pulse is measured from time $t_n$ to time $t_{n+1}$; this period is defined as $$\Delta_2 = t_{n+1} - t_n. \tag{2}$$

The start velocity, a, is unknown. The deceleration, b, is also unknown, but is a constant. The angular velocity at any time t therefore is expressed as $$\dot{\theta} = a - bt. \tag{3}$$

Finally, the angular distance, s, between encoder pulses is given as $$s = \int \dot{\theta} \, dt. \quad (4)$$

The stop time, $t_o$, is defined as that time when the angular velocity is zero, and, from Equation (3), is seen to be $$t_o = (a/b). \quad (5)$$

Combining Equations (1) through (5), it is seen that $$t_o = \frac{\Delta_1^2 + \Delta_2^2}{2(\Delta_2 - \Delta_1)} + t_n. \quad (6)$$

This is a general statement and holds true regardless of initial velocity, so long as deceleration is constant. The expression may be simplified, with no loss of generality, by establishing time $t_{n-1}$ as a zero reference time. This reduces the expression for $t_o$, the time at which angular velocity is zero, to $$t_o = \frac{1}{2}(\Delta_1 + \Delta_2) + \frac{\Delta_1 \cdot \Delta_2}{\Delta_2 - \Delta_1}. \quad (7)$$

Despite the generality, it is of practical value to make the encoder pulse measurements at as low an angular velocity as possible. At a velocity close to cutoff, the torque due to windage influences is quite small, and the deceleration is constant since the dynamic braking torque, under current feedback control, is large and constant.

It is desirable that the timing pulses provide an accurate indication of rotational displacement. Two factors contribute to inaccuracies in this regard: (1) eccentricity in the track of pulse-generating marks, and (2) lack of exactitude in the width and spacing of the pulse-generating marks. The apparatus and method of the present invention, which are to be discussed in detail in the succeeding paragraphs, compare the time durations of two consecutive pulses. It can be seen that on a disc having 1,024 pulse-generating marks disposed circumferentially about its center, the effect of slight eccentricity on the difference in durations of two consecutive pulses is barely perceptible, and the first factor may be dismissed as being of negligible effect. The second factor, however, may be significant. The inaccuracies due to both factors may be remedied by use of the apparatus and method taught by me in my co-pending application, Ser. No. 499,795, "Apparatus And Method For Generating Calibrated Optical Encoder Pulses" filed concurrently herewith on May 31, 1983, and assigned to the same assignee as the present invention.

Figure 2:
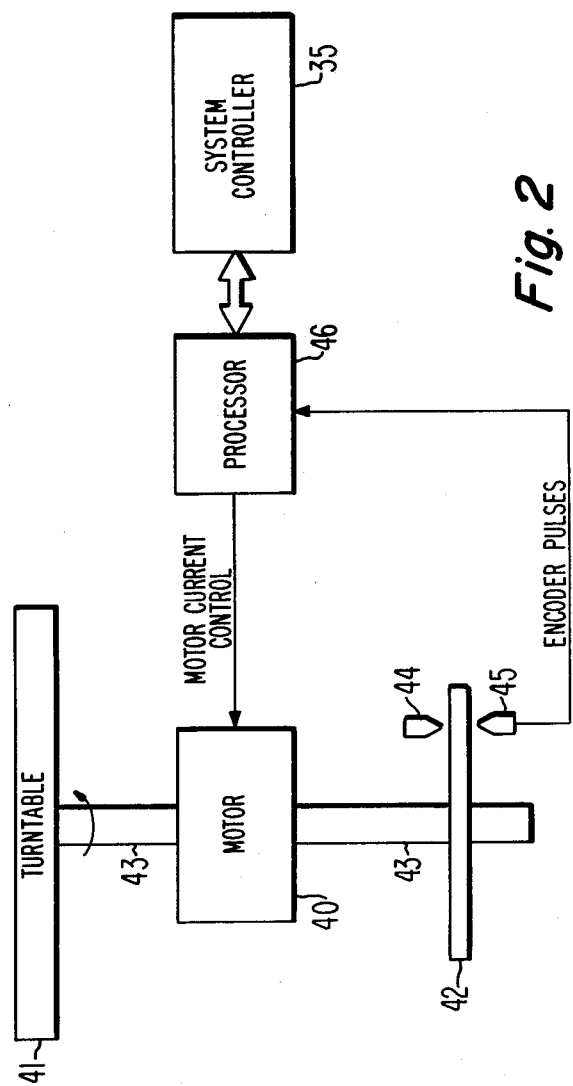
FIG. 2 is a block diagram of a system in which the present invention finds application.

Referring to FIG. 2, a block diagram is shown of a system into which the present invention may find application. Motor 40 drives turntable 41 and angular encoder disc 42 which are coupled to motor shaft 43. Light source 44 directs a beam of light onto one surface of encoder disc 42, to which light detector 45, located on the other side of disc 42, generates the ENCODER PULSES signal which is applied to motor braking processor 46. Processor 46 works in conjunction with system controller 35 to generate the MOTOR CURRENT CONTROL signal which determines when the braking current to motor 40 is to be interrupted.

In the following description of the apparatus, reference will be made to 74LS T²L integrated circuit types similar to those sold by, for example, National Semiconductor Corp., Santa Clara, Calif. This reference is made merely by way of example, in order to provide a clear understanding of the invention, and is not intended to limit the invention thereby.

Figure 3:
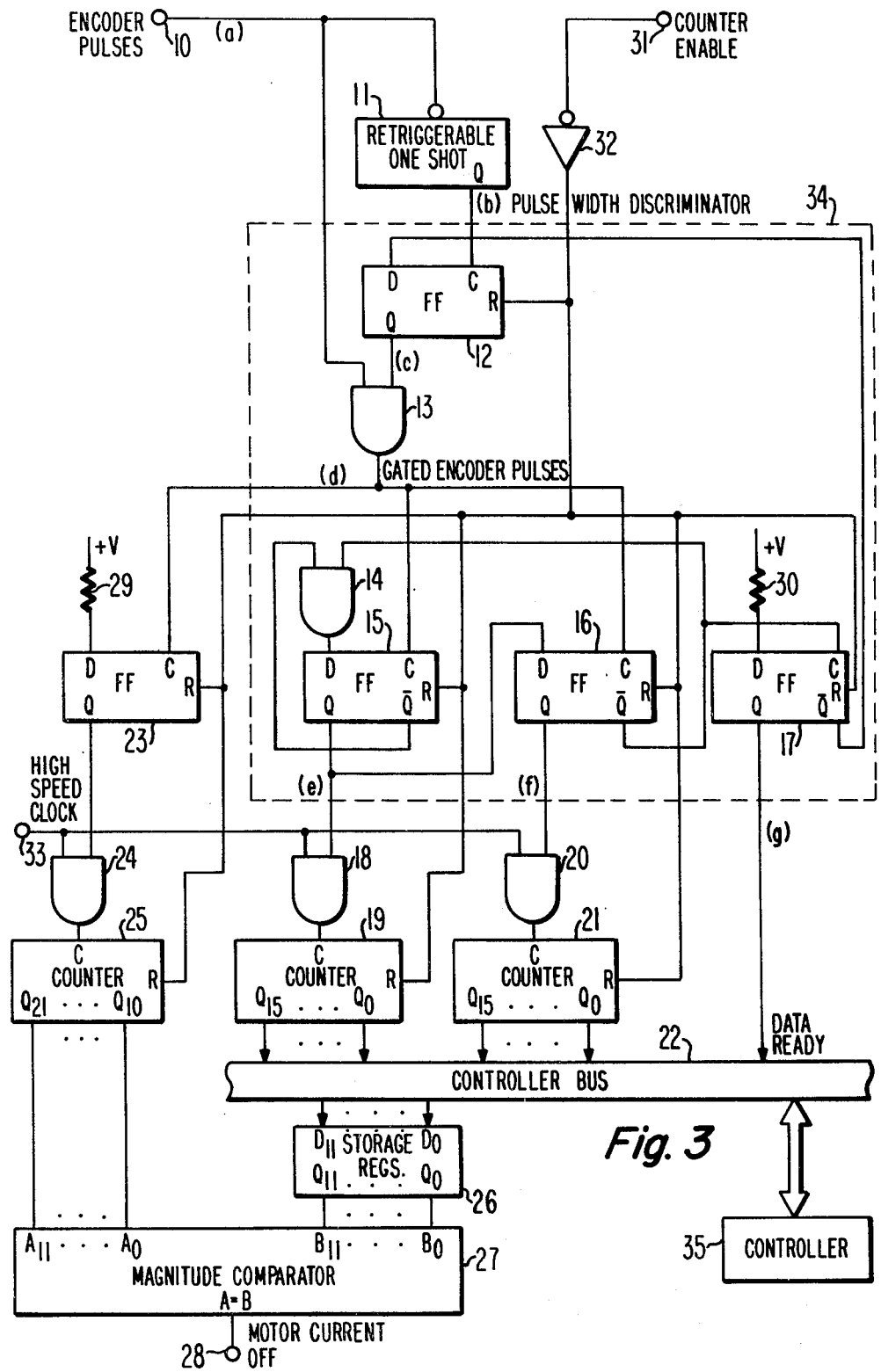
FIG. 3 is a detailed block diagram of the preferred embodiment of the present invention.

Referring to FIG. 3, a detailed block diagram of a preferred embodiment of the present invention is shown. A signal, ENCODER PULSES, received from light detector 45 (in FIG. 2) and applied at terminal 10, is coupled to the inverting input of retriggerable one shot 11 which may be, for example, a type similar to type 74LS123. The Q output terminal of one shot 11 is coupled to the clock (C) input terminal of positive-edge-triggered flip-flop 12. AND gate 13 gates the Q output of flip-flop 12 with ENCODER PULSES, thereby providing the signal GATED ENCODER PULSES, which is applied to the clock (C) input terminals of flip-flops 15, 16 and 23. Flip-flops 15, 16, 17 and 23 are, like flip-flop 12, triggered on the positive-edges of their clock signals.

Flip-flop 15 may be triggered to its set state when its data (D) input is true; this occurs when AND gate 14 determines that flip-flops 15 and 16 are both reset. Flip-flop 16 may be triggered to its set state when flip-flop 15 is set. Flip-flop 17 is triggered to a set state whenever flip-flop 16 resets, by virtue of the positive voltage applied to its D input terminal through resistor 30. Flip-flops 12, 15, 16 and 17 and gates 13 and 14 comprise pulse width discriminator 34.

Flip-flop 23 is triggered to a set state on the first positive edge of the GATED ENCODER PULSES signal coupled to its clock input terminal, by virtue of the positive voltage applied to its D input terminal through resistor 29.

The signals at the Q output terminals of flip-flops 15, 16 and 23 are coupled to first inputs of AND gates 18, 20 and 24, respectively. The HIGH SPEED CLOCK signal, applied at terminal 33, is coupled to counters 19, 21 and 25 through AND gates 18, 20 and 24, respectively, when these gates are enabled by the signals at the Q output terminals of flip-flops 15, 16 and 23, respectively. Counters 19 and 21 may each be, for example, 16-bit, binary, ripple-carry counters whose output terminals are coupled to the data bus 22 of controller 35, which may be a microprocessor. The signal at the Q output terminal of flip-flop 17 is also coupled to controller bus 22. Counter 25 may be, for example, a 22-bit, binary, ripple-carry counter. The twelve signals at the twelve most significant Q output terminals of counter 25 are coupled to a first set of input terminals, $A_0$ through $A_{11}$, of comparator 27, which may comprise, for example, a cascade of digital magnitude comparators similar to type 74LS85.

Controller 35 outputs onto bus 22 information which, in the present example, is a 12-bit data word. This information is stored in 12-bit storage register 26, which output terminals are coupled to a second set of input terminals, $B_0$ through $B_{11}$, of comparator 27. When the 12-bit word at the $A_i$ input terminals of comparator 27 is equal to the 12-bit word at its $B_i$ input terminals, the signal at the A=B output terminal, MOTOR CURRENT OFF, is activated.

The COUNTER ENABLE signal, applied at input terminal 31 and coupled to the input terminal of inverter 32 and to the reset (R) input terminals of flip-flops 15, 16, 17 and 23 and counters 19, 21 and 25, maintains the apparatus in a reset state when the braking procedure is not in operation.

In the discussion of the operation of the apparatus of the present invention, reference will be made to FIG. 3 and to FIG. 4, which comprises seven timing diagrams, (a) through (g), representing signals at several points similarly indicated on the block diagram schematic of FIG. 3. Briefly, the operation of the apparatus of FIG. 3 proceeds as follows: One shot 11 inhibits the operation of pulse width discrimintor 34 until the period of a first pulse of ENCODER PULSES exceeds a predetermined time. The duration of the next pulse is then stored in flip-flop 15 and is measured by gate 18 and counter 19. The next succeeding pulse is stored in flip-flop 16 and measured by gate 20 and flip-flop 21. Information corresponding to the durations of the two measured pulses is provided to controller 35 via bus 22. Controller 35 determines, according to the two measured durations, $\Delta_1$ and $\Delta_2$, the time, $t_0$, at which the motor will reach zero velocity, and places this information onto bus 22, where it is read into register 26 and compared, in comparator 27, to the time duration from the onset of the first measured pulse being counted in counter 25. A more detailed description of the operation follows.

Figure 4:
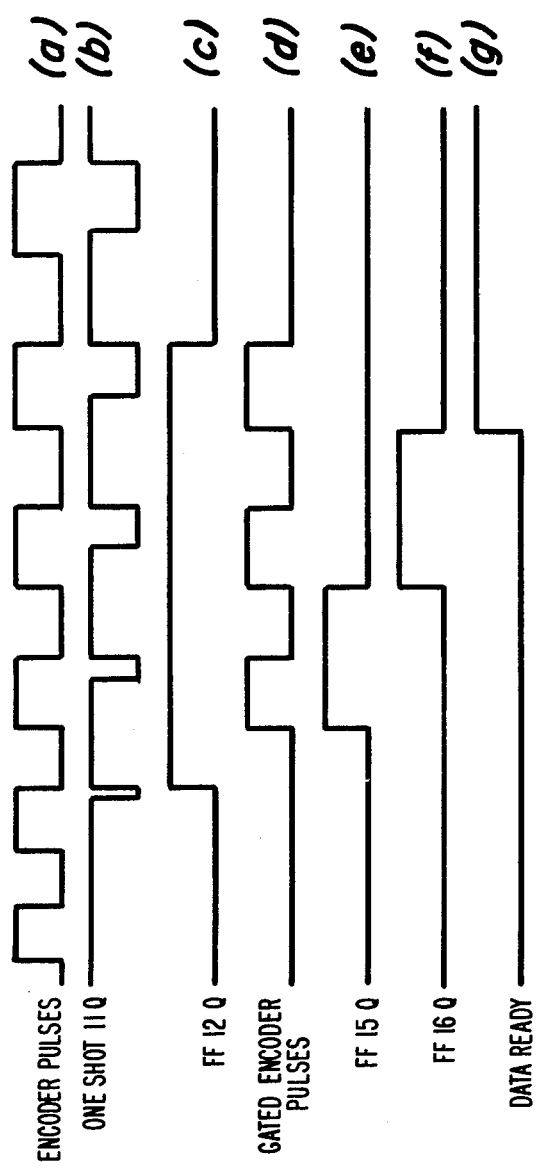
FIG. 4 is a series of timing charts useful in explaining the operation of the apparatus of FIG. 3.

The ENCODER PULSES signal, shown in timing diagram (a) of FIG. 4 as a square-wave signal with linearly-increasing period, retriggers one shot 11 on each negative-going edge. So long as the period of ENCODER PULSES is less than the pulse width of one shot 11, as determined by its externally-connected resistance and capacitance (not shown), one shot 11 remains in a set state, i.e., the signal at its Q output terminal remains high. However, as the period of ENCODER PULSES increases so as to exceed the width of the output pulse of one shot 11, a short negative pulse apears at the Q output terminal, as shown in (b) of FIG. 4. The positive-going, trailing edge of this pulse triggers flip-flop 12 to its set state, as shown in (c) of FIG. 4, thereby enabling ENCODER PULSES through AND gate 13, and generating the signal GATED ENCODER PULSES at its output terminal, as shown in (d) of FIG. 4.

The first positive-going edge of GATED ENCODER PULSES sets flip-flop 15, as shown in (e) of FIG. 4, by virtue of AND gate 14 being enabled by the previously reset states of flip-flops 15 and 16, i.e., both Q outputs were high. The second positive-going edge of GATED ENCODER PULSES resets flip-flop 15, as shown in (e) of FIG. 4, and sets flip-flop 16, as shown in (f) of FIG. 4, by virtue of the previously set state of flip-flop 15. The third positive-going edge of GATED ENCODER PULSES resets flip-flop 16, which thereby causes flip-flop 17 to set, generating the DATA READY signal onto controller bus 22, as shown in (g) of FIG. 4. The set state of flip-flop 17 disables the D input of flip-flop 12, causing it to reset on the next positive-going transition of the signal at the Q output of one shot 11, as shown in (c) of FIG. 4, and inhibiting any additional activity on the GATED ENCODER PULSES signal for the duration of the operation.

During the period that flip-flop 15 is set, AND gate 18 is primed to enable the HIGH SPEED CLOCK signal to the C input terminal of counter 19. Counter 19 thus measures the period during which flip-flop 15 is set, in terms of number of pulses of HIGH SPEED CLOCK. This number, referred to as $\Delta_1$, appears at the $Q_0$ through $Q_{15}$ output terminals of counter 19, and is applied to controller bus 22. Similarly, counter 21 records the number of pulses of HIGH SPEED CLOCK which occur while AND gate 20 is enabled by the set state of flip-flop 16. This number, $\Delta_2$, which is greater than $\Delta_1$, as the encoder pulses are linearly increasing, is also applied to controller bus 22 from the $Q_0$ through $Q_{15}$ output terminals of counter 21. In the meantime, flip-flop 23, which was set simultaneously with the setting of flip-flop 15 and has so remained, enables, via AND gate 24, pulses of the HIGH SPEED CLOCK to clock counter 25, thus establishing the time reference from which $\Delta_1$ was measured.

From the values of $\Delta_1$ and $\Delta_2$, controller 35 determines from the formula given as Equation (7) above, the value of $t_0$, the time (measured from the first positive-going transition of GATED ENCODER PULSES) at which the velocity of the rotating disc will be zero. Controller 35 places this $t_0$ value on bus 22, where it is read into storage registers 26. The stored value is then applied to the B input terminals of comparator 27 which compares the magnitude of the stored value of $t_0$ with the numbers represented by the output signals of counter 25, which are applied to the A input terminals of comparator 27. When the counting value reaches the stored $t_0$ value, the A=B output terminal generates the signal MOTOR CURRENT OFF at output terminal 28 which results in an interruption of the braking current applied to the motor.

It will be noted that, in the example shown in FIG. 3, counter 25 is impliedly depicted as having at least twenty-two stages, but that only the twelve most significant output stages are applied to the A input terminals of comparator 27. In like manner, only twelve bits of the $t_0$ word are stored in registers 26 and applied to the B input terminals of comparator 27. It will be seen, in the discussion relating to a numerical example which follows, that the binary representation of $t_0$ requires far more than twelve bits. Nevertheless, it will be easily understood that the precision afforded by the twelve bits that are provided, i.e., the twelve most significant out of twenty-two, is ample to turn off the motor current at substantially zero rotational velocity.

The present invention finds application in a rotating disc system having parameters similar to those which follow. The disc is driven to rotate at 30 Hz, and the controlled braking current is applied to cause the disc to stop after one second. The disc has 1,024 equally-spaced encoder pulse generating marks circumferentially disposed. At such times as the disc is rotating at or near full speed, one shot 11 is retriggered by the ENCODER PULSES signal at a frequency which maintains the signal at the Q output terminal constantly high. At or near the time that braking begins, by the application of reverse dc current to the motor, the COUNTER ENABLE signal, applied at input terminal 31, is set to its true (high) level, thereby removing the jam reset signals from the R input terminals of flip-flops 12, 15, 16, 17 and 23, and counters 19, 21 and 25. The pulse width of one shot 11 is preset to an encoder pulse width period corresponding to about five percent of the normal running speed, or approximately 0.65 milliseconds. Using a HIGH SPEED CLOCK frequency of 30 MHz, $\Delta_1$ will be about 19,500 counts and $\Delta_2$ about 20,200 counts. Hence, it is seen that 16 binary stages in counters 19 and 21 are adequate to contain the expected values for $\Delta_1$ and $\Delta_2$. Furthermore, during the approximately 50 milliseconds between the encoder pulse initiating $\Delta_1$ and the zero velocity state, there are approximately 1.5 million pulses of the HIGH SPEED CLOCK. Hence, 22 binary stages of counter 25 are ample. Finally, by employing only the twelve most significant bits of counter 25, and thereby truncating the ten least significant bits of both the computed value for $t_0$ (stored in register 26) and the elapsed time being counted in counter 25, a maximum error of approximately 34 microseconds is introduced. This amounts to a maximum residual angular velocity of approximately 0.37 degrees per second, which may be considered as negligible.

Other embodiments of the present invention will be apparent to those skilled in the art to which it pertains. However, the scope of this invention is not intended to be limited to the embodiment described above, but should instead be gauged by the breadth of the claims which follow.

What is claimed is:

1. In a system including a motor wherein braking is effectuated by the application thereto of reverse current, said system further including means for generating a succession of pulses having time durations substantially inversely proportional to the rotational speed of said motor, an apparatus comprising:

means for measuring the time durations of said pulses;

means responsive to a first and a second of said time durations measurements, wherein said second time duration measurement is made subsequent to said first time duration measurement, for computing the time at which the rotational speed of said motor will be zero;

means responsive to said computing means for generating a signal to cause interruption of said reverse current.

2. The apparatus according to claim 1 further including means for applying a source of high speed clock signals to said measuring means, and wherein said measuring means includes first and second counter means for counting occurrences of said high speed clock signals during the time durations of said pulses.

3. The apparatus according to claim 2 further including:

third counter means coupled to said applying means for counting occurrences of said high speed clock signals from the onset of said first time duration measurement; and register means for storing a signal representation of said computed time;

wherein said means for generating a signal to cause interruption of said reverse current includes a comparator for comparing the contents of said register means to the count of said third counter means.

4. The apparatus according to claim 1 further including means for inhibiting the operation of said measuring means while said pulses are of less duration than a predetermined time duration.

5. In a system including a motor wherein braking is effectuated by the application thereto of reverse current, said system further including means for generating a succession of pulses having time durations substantially inversely proportional to the rotational speed of said motor, an apparatus comprising:

means for measuring the time durations of said pulses; and means for generating a signal to cause interruption of said motor current at an ascertainable time, $t_0$, wherein $t_0$ is measured from the onset of one of said pulses and is related to the time duration, $\Delta_1$, of said one pulse and the time duration, $\Delta_2$, of the next pulse following said one pulse, according to:

$$t_o = \frac{1}{2}(\Delta_1 + \Delta_2) + \frac{\Delta_1 \cdot \Delta_2}{\Delta_2 - \Delta_1}.$$

6. The apparatus according to claim 5 further including means for applying a source of high speed clock signals to said measuring means, and wherein said measuring means includes first and second counter means for counting occurrences of said high speed clock signals during the time durations of said pulses.

7. The apparatus according to claim 6 further including:

third counter means coupled to said applying means for counting occurrences of said high speed clock signals from the onset of said one pulse; and register means for storing a signal representation of $t_0$;

wherein said means for generating a signal to cause interruption of said motor current includes a comparator for comparing the contents of said register means to the count of said third counter means.

8. The apparatus according to claim 5 further including means for inhibiting the operation of said measuring means while said pulses are of less duration than a predetermined time duration.

9. In a system including a motor having a rotating shaft, wherein braking is effectuated by the application to said motor of reverse current controlled so as to cause constant deceleration of said rotating shaft, an apparatus for providing a control signal to cause interruption of said reverse current when the angular velocity of said rotating shaft is substantially zero, said apparatus comprising:

coupling means for providing a signal comprising pulses, wherein the time duration between each consecutive pair of said pulses is substantially inversely proportional to the instantaneous rotational speed of said shaft;

means for measuring the time durations of said pulses; and means for generating a control signal to cause interruption of current to said motor at an ascertainable time, $t_0$, wherein $t_0$ is measured from the onset of one of said pulses and is related to the time duration, $\Delta_1$ of said one pulse and the time duration, $\Delta_2$, of the next pulse following said one pulse, according to:

$$t_o = \frac{1}{2}(\Delta_1 + \Delta_2) + \frac{\Delta_1 \cdot \Delta_2}{\Delta_2 - \Delta_1}.$$

10. The apparatus according to claim 9 further including means for applying a source of high speed clock signals to said measuring means, and wherein said measuring means includes a first counter for counting occurrences of said high speed clock signals during said one pulse and a second counter for counting occurrences of said high speed clock signals during said next pulse.

11. The apparatus according to claim 9 further including:

counter means for counting occurrences of a high speed clock signal from the onset of said one pulse; and register means for storing a signal representation of $t_0$;

wherein said generating means includes a comparator for comparing the contents of said register means to the count of said counter means.

12. The apparatus according to claim 9 further including means for inhibiting the operation of said measuring means while said pulses are of less duration than a predetermined time duration.

13. The apparatus according to claim 12 wherein said inhibiting means includes a one shot circuit.

14. The apparatus according to claim 9 further including an encoder disc affixed to said rotating shaft.

15. The apparatus according to claim 14 further including:
- source means for directing a beam of light at a position on one surface encoder disc; and
- detector means located at the opposite surface of said disc adjacent said position, said detector means responsive to said beam of light for generating said signal comprising pulses.

* * * * *